United States Patent [19]

Dwoark et al.

[11] Patent Number: 4,535,683

[45] Date of Patent: Aug. 20, 1985

[54] PISTON WITH A MEMBER MADE OF PARTIALLY STABILIZED ZIRCONIUM OXIDE

[75] Inventors: Ulf Dworak, Baltmannsweiler; Hans Olapinski, Aichwald; Dieter Fingerle, Hochdorf; Ulrich Krohn, Leonberg, all of Fed. Rep. of Germany

[73] Assignee: Feldmuhle Aktiengesellschaft, Dusseldorf, Fed. Rep. of Germany

[21] Appl. No.: 536,214

[22] Filed: Sep. 27, 1983

[30] Foreign Application Priority Data

Oct. 9, 1982 [DE] Fed. Rep. of Germany ....... 3237469

[51] Int. Cl.³ ............................. F02F 3/12; F16J 1/01

[52] U.S. Cl. ........................................ 92/224; 92/222; 123/193 P

[58] Field of Search ................. 92/224, 212, 213, 222, 92/176, 259; 29/156.5 R, 447; 123/193 P, 668, 669

[56] References Cited

U.S. PATENT DOCUMENTS 3,882,841 5/1975 Silverstein ..................... 29/156.5 R
4,343,229 8/1982 Tsuzuki et al. ................... 92/224 X
4,404,935 9/1983 Kraft ................................ 92/224 X
4,419,925 12/1983 Tsuzuki et al. .................. 92/224 X

OTHER PUBLICATIONS

Woods, M. E. and Oda, I., "PSZ Ceramics for Adiabatic Engine Components", SAE Technical Paper Series, #820429, Feb. 22-26, 1982.

Wacker, E. and Sander, W., "Piston Design for High Combustion Pressures and Reduced Heat Rejection to Coolant", SAE Technical Paper Series, #820505, Feb. 22-26, 1982.

*Primary Examiner*—Irwin C. Cohen
*Attorney, Agent, or Firm*—Max Fogiel

[57] ABSTRACT

A piston arrangement with a metal shaft, a piston head that is attached to it with a shrink ring, and a member made of partially stabilized zirconium ozide. The top which demarcates the combustion chamber, of the piston head, consists entirely of the member made of partially stabilized zirconium oxide. The bottom of the zirconium-oxide member is a truncated cone and the top of the shaft is a truncated cone. They are surrounded by an annular component that is split into two sections parallel to the longitudinal axis of the piston. The annular ocmponent is secured with an outside shrink ring.

11 Claims, 3 Drawing Figures

Fig. 2
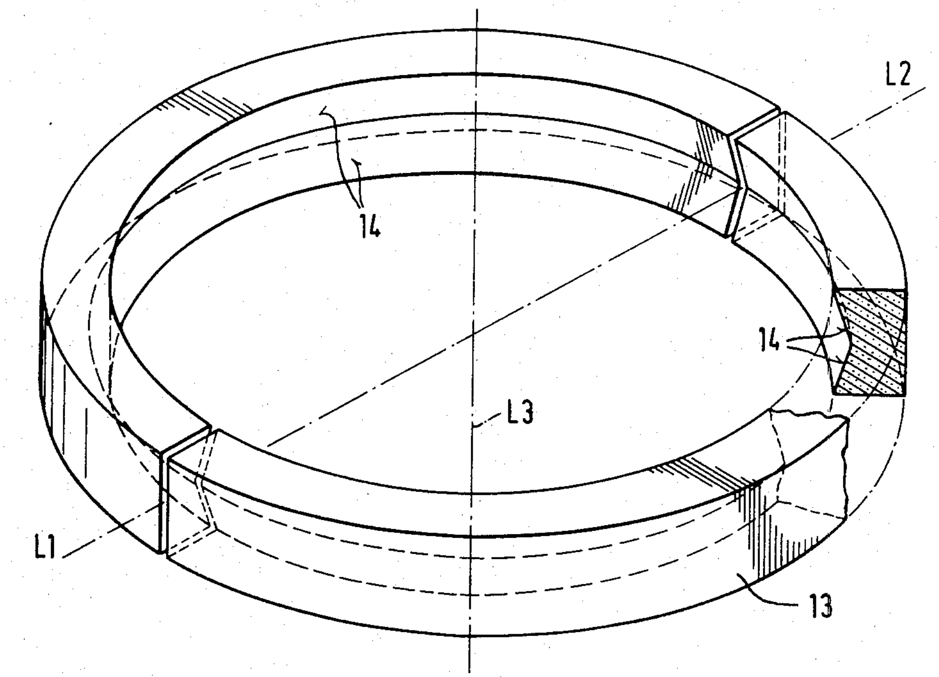
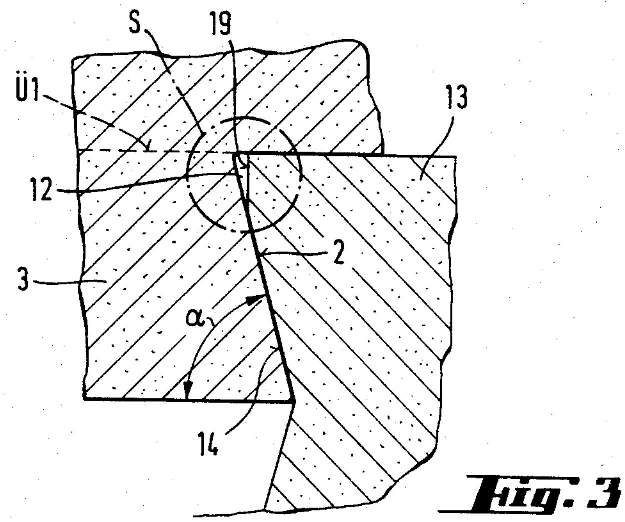
Fig. 3

PISTON WITH A MEMBER MADE OF PARTIALLY STABILIZED ZIRCONIUM OXIDE

BACKGROUND OF THE INVENTION

The present invention relates to a piston with a metal shaft and a piston head that is attached to it with a shrink ring, that faces the combustion chamber, that can if necessary have a combustion pan, and that has a member made of partially stabilized zirconium oxide. The shaft can have a pair of gudgeon-pin bosses or other means of attaching a connecting rod.

A piston with a member made of partially stabilized zirconium oxide (PSZ) that constitutes part of the head is known from "Piston Design for High-Combustion Pressures and Reduced Heat Rejection to Coolant" by Wacker and Sander. The head described in that article is attached to the piston with a steel ring shrunk around the partially stabilized zirconium-oxide member and screwed to an aluminum piston shaft. One drawback of this type of piston is that the side of the head that faces the combustion chamber does not consist entirely of the zirconium-oxide member, whereas the ring forms a heat-sink bridge. Another and decisive disadvantage that is described, however, is that high thermally induced stresses occur as the result of the properties of the zirconium oxide and lead to destruction of that member.

"PSZ Ceramics for Adiabatic Engine Components" by Woods and Oda describes another piston with a member made of partially stabilized zirconium oxide. This member, which has a combustion pan, has a collar shrunk at the edge into an iron piston shaft. Since the shaft is attached flush to the collar, the drawback of insufficient insulation occurs here as well because the edge of the shaft constitutes a heat-sink bridge. Another disadvantage of this piston is that it can be manufactured essentially only out of iron because its thermal expansion must correspond to that of zirconium oxide. Most steels and aluminum, which is often used in such applications, are inappropriate because their thermal expansion is higher.

Although one particular development of this proposal, in which the metal piston shaft is covered by the collar of the partially stabilized zirconium-oxide member and attached to the section of the member below the collar with a shrink component, does completely insulate the shaft, the shrunk connection does very little to prevent the member from coming loose.

SUMMARY OF THE INVENTION

One object of the present invention is a piston with a metal shaft and a member made of partially stabilized zirconium oxide with improved heat insulation with respect to the combustion chamber. Another object of the invention is a rigid and operationally reliable attachment of the shaft to the partially stabilized zirconium-oxide member, preventing thermally induced stress cracks in the individual components. Still another object of the invention is a piston that is easy to assemble and install.

These objects are attained in accordance with the invention in a piston with a metal shaft and a piston head that is attached to it with a shrink ring, that faces the combustion chamber, that can if necessary have a combustion pan, and that has a member made of partially stabilized zirconium oxide in that (a) the entire cross-section of the top, which demarcates the combustion chamber, of the piston head consists of the member made of partially stabilized zirconium oxide, (b) the bottom of the zirconium-oxide member is a truncated cone, the diameter of its base, at the plane where it contacts the shaft, being longer than its diameter at the transition into the top of the member, (c) the top of the shaft is a truncated cone, the diameter of its base, at the plane where it contacts the base of the zirconium oxide member, being the same as that of said base, and the section of the shaft just below the truncoconicular top is a cylinder, the diameter of the shaft being shorter at the transition from its truncoconicular top to the cylindrical section just below it than the diameter of the base of the truncoconicular bottom of the zirconium-oxide member, (d) the truncoconicular bottom of the zirconium-oxide member and the truncoconicular top of the shaft are positively surrounded by an annular component that is split into two sections parallel to the longitudinal axis of the piston, its inside contour matching the truncated cones of both the bottom of the zirconium-oxide member and the top of the shaft, and (e) the annular component is secured with an outside shrink ring.

The present invention accordingly provides a piston that is completely heat-insulated from the combustion chamber and that allows the separate components to be easily assembled in such a way that they will be absolutely secure and reliable in operation. Another advantage of the piston in accordance with the invention is that it and its components are designed so that the truncoconicular section of the zirconium-oxide member is subject to compression strain, counteracting any thermally induced critical tangential tensile stresses. Still another and particular advantage is that prestresses can be varied over the angle of taper in accordance with the results of tension analysis. The design of this piston, which takes the properties of partially stabilized zirconium oxide into consideration, is also very practical because it allows the shaft to be made out of aluminum, saving a considerable amount of weight in relation to known pistons with a member made of partially stabilized zirconium oxide.

In one embodiment with a very practical design the piston in accordance with the invention has piston-ring grooves in the outside surface of the shrink ring.

In another preferred embodiment the shrink ring is made out of steel.

The annular component can be made out of various materials. In one preferred embodiment, it is made out of steel, whereas in another it is made of partially stabilized zirconium oxide.

In one preferred embodiment the shaft of the piston is made out of aluminum.

In one embodiment that is especially appropriate for generating beneficial tensile stresses, the angle of taper of the truncoconical section of the zirconium-oxide member is between 70° and 85° and preferably between 75° and 82°.

To counteract thermally induced stresses from the aspect of design, the inside contour of the annular component in one especially preferred embodiment of the invention does not precisely match the contour of the truncoconicular section of the zirconium-oxide member at the transition from its top to its bottom but is very practically rounded or beveled at that point.

Some preferred embodiments of the invention will now be described, without restricting the invention in any way, with reference to the attached drawings.

BRIEF DESCRIPTION OF THE DRAWINGS

FIG. 2 is a perspective view of the annular component, and FIG. 3, is a detail of a section through an embodiment of the invention in which the inside contour of the annular component is slightly beveled and does not precisely match the contour of the truncated cone.

DETAILED DESCRIPTION OF THE PREFERRED EMBODIMENTS

Figure 1:
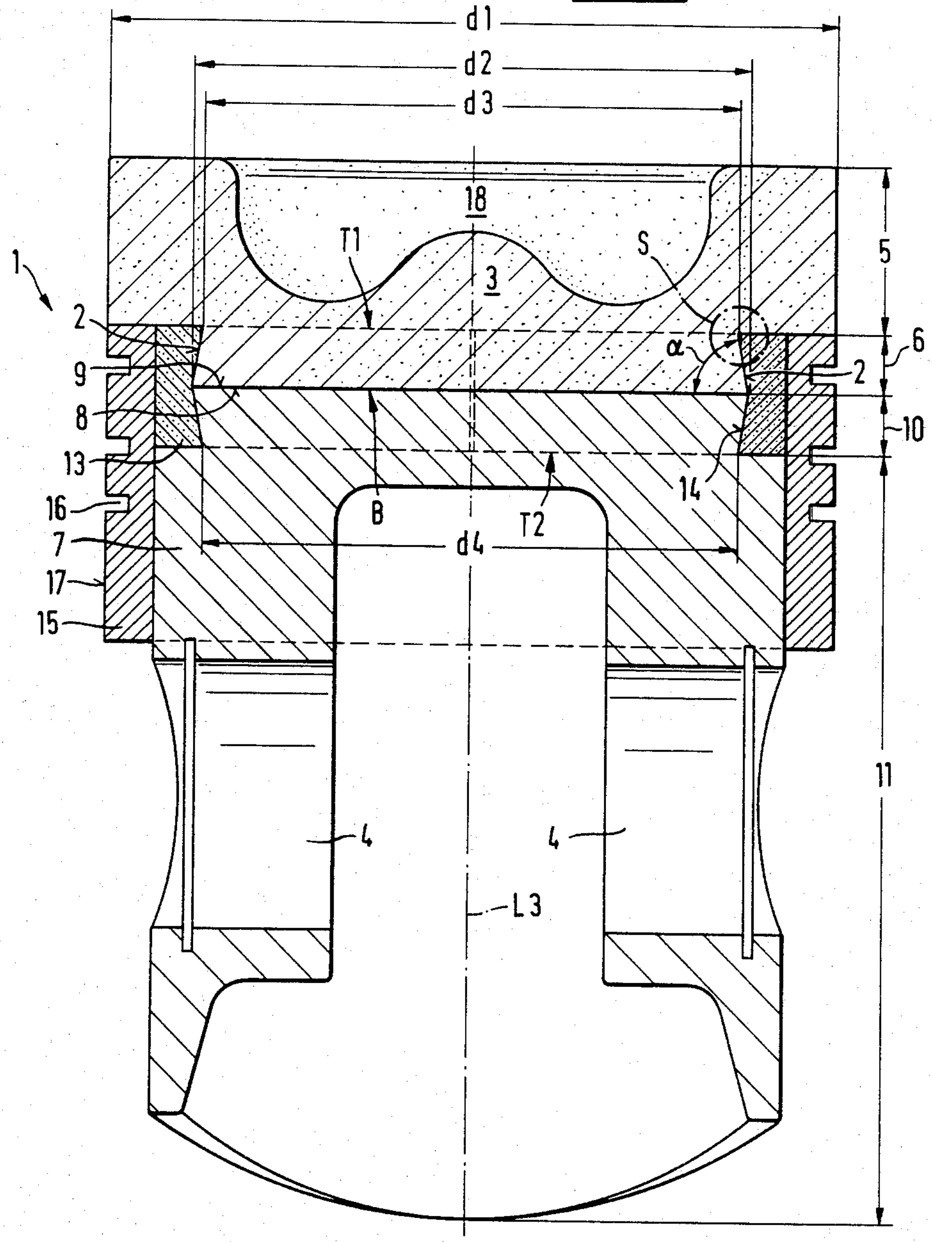
FIG. 1 is a longitudinal section through one embodiment of a piston in accordance with the invention.

The piston 1 illustrated in FIG. 1 has a member 3 made of partially stabilized zirconium oxide. The top 5 of the piston head demarcates a combustion chamber that is not illustrated. All of the section of top 5 that has the diameter d1 consists of member 3. At the transition T1 between the top 5 and the bottom of the head, member 3 merges into a truncated cone with an angle $\alpha=80°$ of taper. The diameter d3 of the truncated cone is shorter at transition T1 than the diameter d2 of member 3 at the plane B where it contacts the base of metal shaft 7. Shaft 7 is made of aluminum. Its top is a truncated cone. The base 9 of shaft 7 that is in contact with member 3 at plane B has the same diameter d2 as the base 8 of that member. The top 10 of shaft 7 is a truncated cone and the section 11 of shaft 7 just below top 10 is a cylinder. The diameter d4 of the shaft at the transition T2 between top 10 and section 11 is shorter than the diameter d2 at its base 9.

An annular component 13 of partially stabilized zirconium oxide that is split into two sections parallel to the longitudinal axis L3 of the piston has an inside contour 14 that matches the truncated cones of both the bottom 6 of zirconium-oxide member 3 and the top 10 of shaft 7. Component 13 positively surrounds bottom 6 and top 10 as they lie in contact. Component 13 is secured with a steel shrink ring 15 that has been heated to 400° C., slipped over shaft 7 and annular component 13, and allowed to cool, shrinking around annular component 13, which thereupon securely clamps member 3 and top 10 together. The inside diameter of shrink ring 15 equals the outside diameter of shaft 7.

There is a combustion pan 18 in the top 5 of the piston head. There are piston-ring grooves 16 in the outside surface 17 of shrink ring 15 that accept piston rings (not illustrated). Shrink ring 15 terminates above a pair 4 of gudgeon-pin bosses. In an embodiment that is not illustrated, however, shrink ring 15 can also be designed to surround the total lower section 11 of shaft 7.

The inside contour 14 of annular component 13 matches the truncated cones of both the bottom 6 of zirconium-oxide member 3 and the top 10 of shaft 7 as illustrated in FIG. 2. Annular component 13 has two sections along line L1–L2 and following the longitudinal axis of the piston along line L3.

FIG. 3 is a detail of a section through an embodiment of the invention in which the sharp upper edge of the inside contour of annular component 13 is slight beveled at a point S. In this embodiment a slight gap 12 is left at the outside contour 2 of member 3 below transition T1 when the piston is assembled.

We claim:

1. A piston arrangement comprising: a metal shaft and a piston head of zirconium oxide attached to said shaft; the entire cross-section of the top of said piston head facing a combustion chamber and comprising said zirconium oxide; said piston head having a bottom shaped as a truncated cone with a first base diameter contacting said shaft at a plane, said cone having a second base diameter at a transition into the top of said piston head, said first diameter being longer than said second diameter; an annular element surrounding substantially the truncoconicular bottom of said piston head, said annular element having separate sections, said annular element having an inside contour matching said truncated cone at the bottom of said piston head, wherein the improvement comprises:

(a) said zirconium oxide being partially stabilized;

(b) said shaft having a top in the form of a truncated cone with a first base diameter contacting the base of said piston head at said plane and being substantially equal to the diameter of said base of said piston head, said shaft having a cylindrically-shaped section substantially below the truncoconicular top, said shaft having a diameter shorter at the transition from its truncoconicular top to said cylindrical section below thereof than the diameter of the base of the truncoconicular bottom of said piston head;

(c) said annular element having an inside contour surrounding and matching the truncoconical top of said shaft;

(d) said annular element being secured with a shrink ring, surrounding said annular element;

(e) said shrink ring stressing said annular element for inducing compression strain in said truncoconicular bottom of said piston head to counteract thermally induced critical tangential tensile stresses.

2. Piston as defined in claim 1, and piston-ring grooves in the outside surface of said shrink ring.

3. Piston as defined in claim 1, wherein said shrink ring is comprised of steel.

4. Piston as defined in claim 1, wherein said annular element is comprised of steel.

5. Piston as defined in claim 1, wherein said annular element is comprised of stabilized zirconium oxide.

6. Piston as defined in claim 1, wherein said shaft is comprised of aluminum.

7. Piston as defined in claim 1, wherein said annular element has a substantially rounded inside contour at a predetermined point adjacent the truncated cone of said piston head.

8. Piston as defined in claim 1, wherein said truncoconical section of said zirconium-oxide piston head has a taper angle between 75° and 82°.

9. Piston as defined in claim 1, wherein said inside contour of said annular element is substantially beveled at a predetermined point adjacent the truncated cone of said piston head.

10. A piston arrangement comprising: a metal shaft and a piston head of zirconium oxide attached to said shaft; the entire cross-section of the top of said piston head facing a combustion chamber and comprising said zirconium oxide; said piston head having a bottom shaped as a truncated cone with a first base diameter contacting said shaft at a plane, said cone having a second base diameter at a transition into the top of said piston head, said first diameter being longer than said second diameter; an annular element surrounding substantially the truncoconicular bottom of said piston head, said annular element having separate sections, said annular element having an inside contour matching said truncated cone at the bottom of said piston head, wherein the improvement comprises:

(a) said zirconium oxide being partially stabilized;
(b) said shaft having a top in the form of a truncated cone with a first base diameter contacting the base of said piston head at said plane and being substantially equal to the diameter of said base of said piston head, said shaft having a cylindrically-shaped section substantially below the truncoconicular top, said shaft having a diameter shorter at the transition from its truncoconicular top to said cylindrical section below thereof than the diameter of the base of the truncoconicular bottom of said piston head;
(c) said annular element having an inside contour surrounding and matching the truncoconical top of said shaft;
(d) said annular element being secured with a shrink ring, surrouding said annular element;
(e) said shrink ring stressing said annular element for inducing compression strain in said truncoconicular bottom of said piston head to counteract thermally induced critical tangential tensile stresses; said piston being heat-insulated from a combustion chamber by said piston head of zirconium oxide, said compression strain providing varied prestresses over said truncated cone angle of taper; the angle of taper of the truncoconical section of said zirconium-oxide piston head being between 70° and 85°.

11. A piston arrangement comprising: a metal shaft and a piston head of zirconium oxide attached to said shaft; the entire cross-section of the top of said piston head facing a combustion chamber and comprising said zirconium oxide; said piston head having a bottom shaped as a truncated cone with a first base diameter contacting said shaft at a plane, said cone having a second base diameter at a transition into the top of said piston head, said first diameter being longer than said second diameter; an annular elemement surrounding substantially the truncoconicular bottom of said piston head, said annular element having separate sections, said annular element having an inside contour matching said truncated cone at the bottom of said piston head, wherein the improvement comprises:

(a) said zirconium oxide being partially stabilized;
(b) said shaft having a top in the form of a truncated cone with a first base diameter contacting the base of said piston head at said plane and being substantially equal to the diameter of said base of said piston head, said shaft having a cylindrically-shaped section substantially below the truncoconicular top, said shaft having a diameter shorter at the transition from its truncoconicular top to said cylindrical section below thereof than the diameter of the base of the truncoconicular bottom of said piston head;
(c) said annular element having an inside contour surrounding and matching the truncoconical top of said shaft;
(d) said annular element being secured with a shrink ring, surrounding said annular element;
(e) said shrink ring stressing said annular element for inducing compression strain in said truncoconicular bottom of said piston head to counteract thermally induced critical tangential tensile stresses; said piston being heat-insulated from a combustion chamber by said piston head of zirconium oxide, said compression strain providing varied prestresses over said truncated cone angle of taper; the angle of taper of the truncoconical section of said zirconium-oxide member being between 70° and 85°; piston-ring grooves in the outside surface of said shrink ring; said shrink ring being comprised of steel; said annular element being comprised of steel; said shaft being comprised of aluminum; said annular element having a substantially rounded inside contour at a predetermined point adjacent the truncated cone of said piston head.

* * * * *